Patented Apr. 17, 1928.

1,666,828

UNITED STATES PATENT OFFICE.

JOSEPH WILLIAM MELLOR, OF STOKE-ON-TRENT, ENGLAND.

MANUFACTURE OF POTTERY OR THE LIKE.

REISSUED

No Drawing. Application filed January 14, 1926, Serial No. 81,310, and in Great Britain March 9, 1925.

This invention relates to a process of manufacturing glazed porous bodied tiles and glazed porous bodied electric fittings.

It is an object of the invention to eliminate the operation known as "biscuit firing" by which the body is first "matured" previously to the second firing of the goods in a "glost kiln" after the glaze has been applied. The temperature of the "glost kiln" is considerably lower than that of the "biscuit kiln" so that there would be economy in conducting the whole of the firing in a "glost kiln".

By my invention the composition of the body is adjusted so that the body matures at a temperature below that represented by Seger cone 01A (1080° C.). This range of temperature includes those temperatures at which the customary or normal glazes for porous bodied tiles and porous bodied electric fittings mature, that is to say, the temperature of the "glost kiln" used in this particular section of the pottery art.

When properly applied, the invention enables the biscuit firing, and all pertaining thereto, to be eliminated from the process of manufacture. The body is modified in the required direction by using as constituents of it one or more fluxes compounded of one or more alkalies, alkaline earths, magnesia or equivalent compounds such as alkali metal carbonates, alkaline earth metal carbonates, magnesium carbonates, or silicates, borates, boro-silicates, alumino-silicates or alumino-borates of these metals. Lead compounds may also be used but for hygienic and other purposes are not desirable. The fluxes are so adjusted that when intimately mixed with the clay or other body material the body matures at the temperature of the glost kiln.

The "flux" which is added to the body is totally distinct from the flux contained in the constituents of the normal body.

It is important that the flux added to the body should be such that dehydration of the body is complete before the maturing temperature is attained; alternatively all or a part of the clays should be pre-calcined either alone or mixed with a portion of the flux or fluxes. This avoids trouble due to dehydration of the clays in the glost kiln. If the plasticity of the body is too small, it is augmented by addition of a suitable mucilage, gum or other colloid.

The invention is particularly applicable to glazed porous bodied tiles and glazed porous bodied electric fittings made by a dust process; also to articles of the character just indicated made by casting or by a pressure-moulding process. When properly applied, this enables the biscuit firing, and all pertaining thereto, to be eliminated from the process of manufacture.

The following examples illustrate the invention:—

(1). In the manufacture of glazed porous bodied tiles, the normal body material consisting of 20 parts by weight of ball clay, 20 parts of china clay, 44 parts of flint and 16 parts of stone, is mixed, preferably in the grinding mill, with $2\frac{1}{4}$ per cent of its weight of a mixture of 1 part of calcium or magnesium borate (commercial borocalcite or boracite) and 2 parts of sodium silicate rich in silica ($Na_2O:SiO_2=1:3$). The body thus made is well suited for a normal tile glaze which matures at the temperature not exceeding Seger cone 01A (1080° C.). The tile having been formed from the body by a dust process, is coated with the glaze and then fired at the said temperature in the manner usual in operating the glost kiln.

(2). A body suitable for glazed porous bodied electric fittings containing 36 parts by weight of ball clay, 12 parts of china clay, 2 parts of flint, 31 parts of felspar and 19 parts of stone, is intimately mixed with $2\frac{1}{2}$ per cent of its weight of a flux consisting of a mixture of one part of calcium borate and two parts of sodium silicate as indicated above. The fittings fashioned from this body are coated with a glaze which matures at a temperature represented by Seger cone 01A (1080° C.), and are fired in the glost kiln at this temperature.

Having thus fully described the nature of the said invention and the best means I know of carrying the same into practical effect, I claim:—

1. A process for the manufacture of glazed porous bodied tiles or glazed porous bodied electric fittings which consists in forming the body of the usual composition, adding thereto a flux which acts at a temperature below that represented by Seger cone 01A (1080° C.) and in quantity not exceeding the equivalent of 3% of the weight of the unfired body, applying to the unfired body a glaze normal for making glazed porous bodied ties or glazed porous bodied electric fittings, and firing the product in a glost kiln.

2. A process for the manufacture of glazed porous bodied tiles or glazed porous bodied electric fittings which consists in forming the body of the usual composition with addition of a flux consisting of calcium borate and alkali silicate rich in silica, this flux being added in such proportion that the body matures at a temperature below the limit represented by Seger cone 01A (1080° C.), applying to the unfired body a glaze normal for making glazed porous bodied tiles or glazed porous bodied electric fittings, and firing the product in a giost kiln.

3. A process for the manufacture of glazed porous bodied tiles or glazed porous bodied electrical fittings which consists in forming the body of the usual composition with addition of a flux consisiting of calcium borate and alkali silicate rich in silica, this flux being added in proportion amounting to not more than 3 per cent of the weight of the unfired body, applying to the unfired body a glaze normal for making glazed porous bodied tiles or glazed porous bodied electric fittings, and firing the product in a glost kiln.

In testimony whereof I have signed my name to this specification.

JOSEPH WILLIAM MELLOR. [L. S.]